US010664302B2

(12) United States Patent
Barker et al.

(10) Patent No.: US 10,664,302 B2
(45) Date of Patent: *May 26, 2020

(54) AUTOMATED ORCHESTRATION OF A VIRTUALIZED COMPUTING ENVIRONMENT

(71) Applicant: International Business Machines Corporation, Armonk, NY (US)

(72) Inventors: Joshua J. Barker, Melbourne (AU); Mark A. Cayley, Melbourne (AU); Andrew P. Lyons, Melbourne (AU); A. Charlotte Wang, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/032,158

(22) Filed: Jul. 11, 2018

(65) Prior Publication Data

US 2018/0321967 A1 Nov. 8, 2018

Related U.S. Application Data

(63) Continuation of application No. 15/218,615, filed on Jul. 25, 2016, now Pat. No. 10,095,539.

(51) Int. Cl.
*G06F 21/00* (2013.01)
*G06F 9/455* (2018.01)
(Continued)

(52) U.S. Cl.
CPC ...... *G06F 9/45558* (2013.01); *H04L 41/0806* (2013.01); *H04L 63/08* (2013.01);
(Continued)

(58) Field of Classification Search
CPC ....... G06F 9/45558; G06F 2009/45595; G06F 2009/4557; H04L 67/1097; H04L 63/08;
(Continued)

(56) References Cited

U.S. PATENT DOCUMENTS

2012/0124211 A1* 5/2012 Kampas ............... G06F 9/50
709/226
2014/0280848 A1 9/2014 Modh et al.
(Continued)

OTHER PUBLICATIONS

Office Action (dated Mar. 30, 2018) for U.S. Appl. No. 15/218,615, filed Jul. 25, 2016.
(Continued)

*Primary Examiner* — Kendall Dolly
(74) *Attorney, Agent, or Firm* — Schmeiser, Olsen & Watts; Mark C. Vallone

(57) ABSTRACT

A method and associated systems for automated orchestration of complex server provisioning tasks. An orchestration-optimization system receives input that identifies a destination, platform, and pattern of tasks that together characterize a procedure for building a particular virtualized computer environment. The system selects a set of generic orchestration methods that identify in general terms each task required to build the environment. The system then embeds into the orchestration methods all currently known contextual data associated with the specified build procedure, converting the generic methods into a build-specific runlist of tasks. When the environment is ready to be built, additional environment-specific data that becomes known only at build time is inserted into placeholders previously embedded into the runlist tasks. The system then performs the sequence of runlist tasks in order to automatically build the virtualized system.

20 Claims, 5 Drawing Sheets

(51) Int. Cl.
*H04L 12/24* (2006.01)
*H04L 29/06* (2006.01)
*H04L 29/08* (2006.01)

(52) U.S. Cl.
CPC .......... *H04L 63/0876* (2013.01); *H04L 67/10* (2013.01); *H04L 67/1097* (2013.01); *G06F 2009/4557* (2013.01); *G06F 2009/45595* (2013.01)

(58) Field of Classification Search
CPC .. H04L 67/10; H04L 41/0806; H04L 63/0876
See application file for complete search history.

(56) References Cited

U.S. PATENT DOCUMENTS

| | | | |
|---|---|---|---|
| 2015/0058467 A1 | 2/2015 | Douglas et al. | |
| 2016/0072899 A1* | 3/2016 | Tung | H04L 41/12 709/223 |
| 2016/0156661 A1* | 6/2016 | Nagaratnam | G06F 21/57 726/1 |
| 2018/0024851 A1 | 1/2018 | Barker et al. | |

OTHER PUBLICATIONS

Amendment (dated Mar. 31, 2018) for U.S. Appl. No. 15/218,615, filed Jul. 25, 2016.

Notice of Allowance (dated May 31, 2018) for U.S. Appl. No. 15/218,615, filed Jul. 25, 2016.

* cited by examiner

AUTOMATED ORCHESTRATION OF A VIRTUALIZED COMPUTING ENVIRONMENT

This application is a continuation application claiming priority to Ser. No. 15/218,615, filed Jul. 25, 2016, now U.S. Pat. No. 10,095,539, issued Oct. 9, 2018.

TECHNICAL FIELD

The present invention relates to provisioning complex enterprise-grade virtual computing environments and, in particular, to automating the orchestration of tasks required to provision a complex system on a hybrid or cloud platform.

BACKGROUND

Provisioning a virtualized enterprise-grade system can be enormously complex. Although existing tools may partially automate the provisioning of a smaller system comprising a handful of virtual machines and software applications, they cannot handle complex enterprise-grade virtual environments that may comprise thousands of virtual machines, extensive virtual infrastructure and networks, distributed applications, multiple operating systems, and a requirement for tight integration with numerous points of management.

Provisioning a complex virtualized system often requires configuration decisions specific to the particular applications being provisioned; to the operating systems, resources, and platforms that underlie the virtualized system; to a location or site that will use the virtualized system; and to the industry, field, or business function of the business that will use the virtual system. Configuration decisions may be further influenced by extrinsic constraints, such as a requirement to comply with certain regulatory and security controls, to collect and store email communications, or to preserve evidence of regulatory compliance.

Existing software tools cannot, however, automatically provision a complex virtualized system. Where utility that partially automates a simple installation may use user input or environmental variables to automatically configure settings for a single-user operating system or software application, provisioning a complex enterprise system can require choosing among many possible combinations of runtime tasks, software components, and elements of communications infrastructure, often resulting in dramatically different implementations across an enterprise.

Furthermore, these choices may be functions of extrinsic factors that are not known until provisioning actually takes place, such as resource host names or dynamically allocated network addresses. Complex virtualized systems are therefore typically configured and provisioned by hand, using expert knowledge of a software team that is familiar with technical issues, resource limitations, business policies, and extrinsic constraints. Managing and tracking such complex installation efforts can require significant resources and, in many cases, results in unexpected costs, delays, and implementation errors.

There is thus a need for a technical solution to the technical problem (which is necessarily rooted in the technology of virtualized software systems) of automating the orchestration of a complex provisioning project as a function of both known characteristics of the entities to be provisioned and of factors that become known only at the time of the provisioning.

BRIEF SUMMARY

A first embodiment of the present invention provides cloud-orchestration optimization system comprising a processor, a memory coupled to the processor, and a computer-readable hardware storage device coupled to the processor, the storage device containing program code configured to be run by the processor via the memory to implement a method for automated orchestration of complex server provisioning tasks, the method comprising:

the system receiving input data that describes characteristics of a virtualized computing environment to be built;

the system selecting a pattern as a function of the receiving, where the pattern specifies a set of generic tasks that must be performed in order to build the virtualized environment;

the system identifying a set of orchestration methods that each identify a generic method of performing a task of the set of generic tasks;

the system populating an attribute set data structure, where the attribute set comprises data elements required by the set of orchestration methods;

the system embedding one or more data elements of the attribute set into the set of orchestration methods in order to instantiate each orchestration method of the set of orchestration methods as a runlist task; and the system compiling the runlist tasks into an orchestration runlist, where the runlist comprises instructions for building the virtualized environment, and where the runlist performs the runlist tasks in an order determined as a function of the pattern.

A second embodiment of the present invention provides method for automated orchestration of complex server provisioning tasks, the method comprising:

a cloud-orchestration optimization system receiving input data that describes characteristics of a virtualized computing environment to be built;

the system selecting a pattern as a function of the receiving, where the pattern specifies a set of generic tasks that must be performed in order to build the virtualized environment;

the system identifying a set of orchestration methods that each identify a generic method of performing a task of the set of generic tasks;

the system populating an attribute set data structure, where the attribute set comprises data elements required by the set of orchestration methods;

the system embedding one or more data elements of the attribute set into the set of orchestration methods in order to instantiate each orchestration method of the set of orchestration methods as a runlist task; and the system compiling the runlist tasks into an orchestration runlist, where the runlist comprises instructions for building the virtualized environment, and where the runlist performs the runlist tasks in an order determined as a function of the pattern.

A third embodiment of the present invention provides a computer program product, comprising a computer-readable hardware storage device having a computer-readable program code stored therein, the program code configured to be executed by a cloud-orchestration optimization system comprising a processor, a memory coupled to the processor, and a computer-readable hardware storage device coupled to the processor, the storage device containing program code configured to be run by the processor via the memory to implement a method for automated orchestration of complex server provisioning tasks, the method comprising:

the system receiving input data that describes characteristics of a virtualized computing environment to be built;

the system selecting a pattern as a function of the receiving, where the pattern specifies a set of generic tasks that must be performed in order to build the virtualized environment;

the system identifying a set of orchestration methods that each identify a generic method of performing a task of the set of generic tasks;

the system populating an attribute set data structure, where the attribute set comprises data elements required by the set of orchestration methods;

the system embedding one or more data elements of the attribute set into the set of orchestration methods in order to instantiate each orchestration method of the set of orchestration methods as a runlist task; and the system compiling the runlist tasks into an orchestration runlist, where the runlist comprises instructions for building the virtualized environment, and where the runlist performs the runlist tasks in an order determined as a function of the pattern.

DETAILED DESCRIPTION

Figure 1:
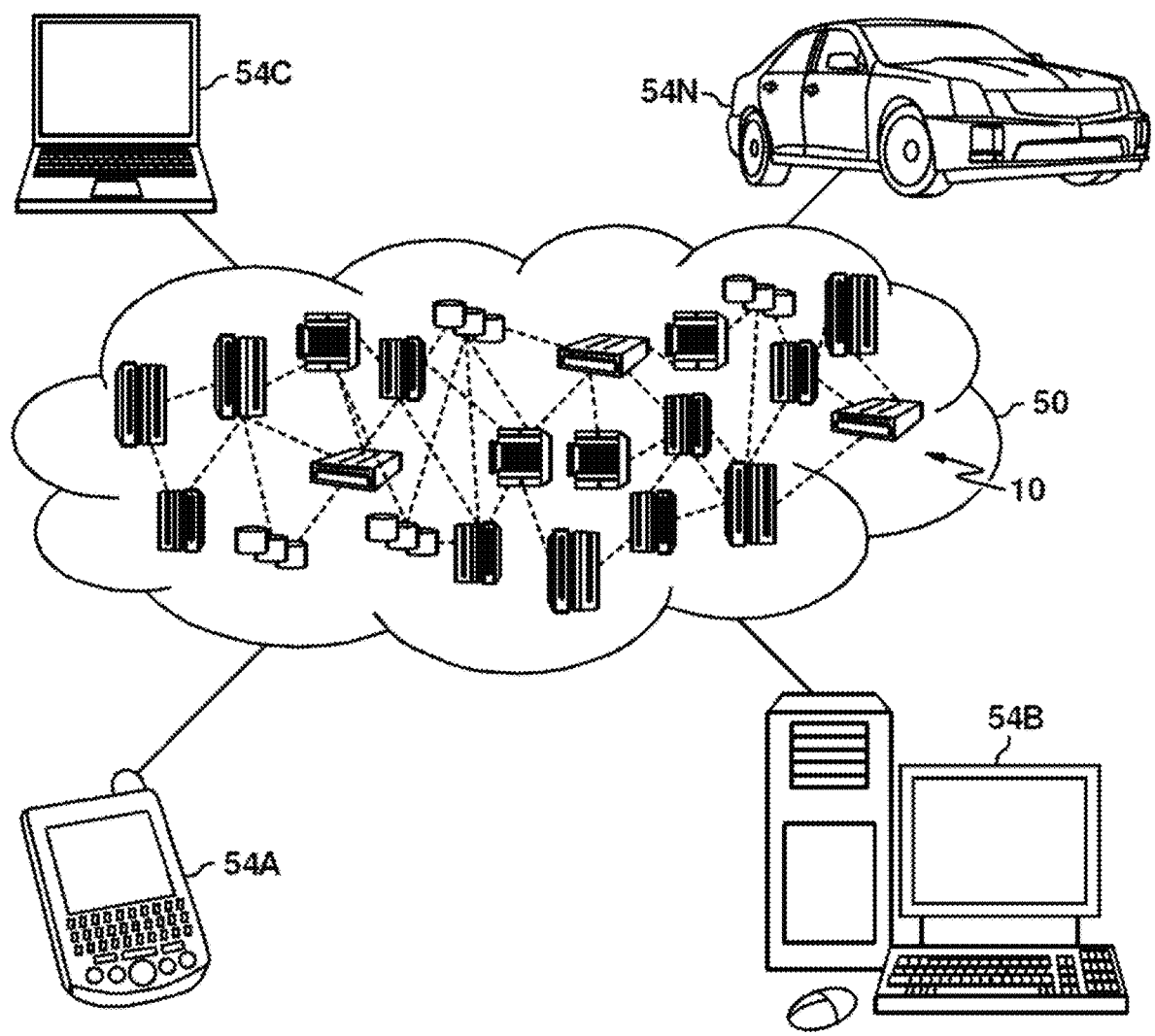
FIG. 1 depicts a cloud computing environment according to an embodiment of the present invention.

Tools that facilitate the orchestration of complex provisioning tasks exist today, but they do not provide a turnkey, fully automated solution that can orchestrate a provisioning effort across a distributed environment or one that comprises larger numbers of users, infrastructure, or sophisticated applications. These tools may automate one aspect of an orchestration effort, but must be manually customized during the orchestration process as a function of specialized user skills and expert knowledge.

One challenge for such tools is the fact that a complex provisioning effort requires numerous orchestration flows that must each be manually configured, even when the flows provision similar resources for a single site. Each instance of an orchestration flow may comprise static business logic and numerous environmental and account-specific parameters that restrict the flow to a narrowly defined set of implementation environments.

This inflexibility greatly limits the usability of even the most robust provisioning-automation tools. Because IT environments continually evolve, every time a user site updates a mission-critical software application, changes a security policy, installs or decommissions hardware, or performs any other activity that alters a computing platform, resource, or environment, new orchestration flows must be manually created in order to properly support those changes. Because of the great complexity of such information flows, these manual creation tasks may be time-consuming and difficult to debug.

These problems are intrinsic to the technology of virtualized computing. Provisioning any virtual-computing environment, whether it be a small virtual LAN or an enterprise-spanning cloud-computing platform, comprises numerous tasks and decisions, some of which are not fully defined until a virtual resource is actually provisioned. When a complex enterprise-grade system is provisioned, each orchestration flow may be required to produce dramatically different results, and the number of tasks and decisions that must be identified and performed at runtime can thus become enormous.

Embodiments of the present invention address this problem by means of a data-driven approach to process orchestration in which low-level orchestration tasks are packaged into reusable modules. At runtime, these modules are dynamically selected, configured, compiled, and augmented with context. The resulting runlists of tasks to perform are then generated as a function of a context-dependent pattern definition specific to a unique installation. This pattern definition can be a function of numerous factors associated with one or more destination platforms or host environments, with a destination location or business function, with user-entered settings, or with other context-dependent attributes that may either be specified in advance or be identified at runtime.

The present invention thus offers a technical advantage of being able to manage a complex orchestration effort with a single orchestration workflow (or business process) that automatically customizes itself at runtime in response to receiving dynamically generated and configured runlists of tasks to perform. This approach eliminates the need to develop and maintain custom orchestration flows for every type of target platform or operating environment. Furthermore, this procedure may be implemented as a discrete, self-contained object, allowing system administrators and other types of system-maintenance personnel to continue to use familiar software tools when performing a complex orchestration.

This document uses the following terminology to describe how the present invention automates the building of a virtualized system:

Pattern: a listing of all components required to build a virtualized system. A pattern may, for example, comprise identifications of a host operating system, middleware applications, backup policies, security policies, server security settings, and software configurations.

Orchestration method: A reusable module that identifies a low-level method or task that may be required in order to build a virtualized system, such as a method for resetting a password, renaming a host server, handling a certain type of exceptions, or setting a user's security level. An orchestration method is a generalized, reusable set of instructions that does not identify build-specific information such as an IP hostname of a particular server, a time or date at which a task must be performed, or a destination site at which the task will be performed. An orchestration method may comprise instructions that are specific to a particular platform, API, or implementation framework, such as SOAP (Simple Object Access Protocol), Microsoft Windows, or REST (Representational State Transfer).

Runlist task: An instantiation of an orchestration method that includes contextual information specific to a particular system build.

Runlist: A sequential list of runlist tasks necessary to build the virtualized environment. A runlist is an instantiation of a pattern that adds contextual information that is specific to a particular build. A single runlist may thus be reused for multiple builds by customizing each instance of the runlist with contextual information stored in the attribute-set data structure and with dynamic information that becomes known only once the build procedure is ready to begin. For example, if a pattern identifies a requirement that a particular type of server must be configured with at least three hard drives and a minimum of 128 GB of memory, a runlist might add build-specific information, such as an IP hostname of the server, a backup policy for the server, encryption standards for the hard drives, or a method of storing server-identifying records in a configuration-management database.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
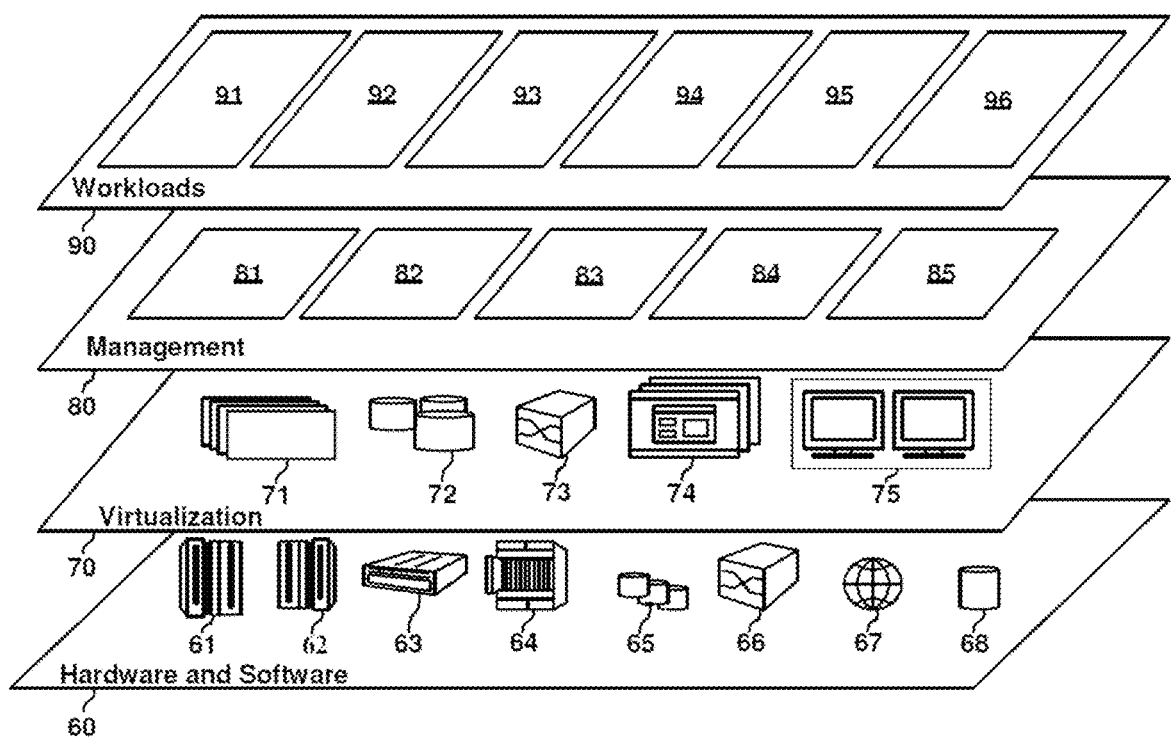
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex provisioning tasks 96 (in accordance with embodiments of the present invention). In some embodiments, this orchestration of complex provisioning tasks may be implemented as a workload split across more than one layer.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
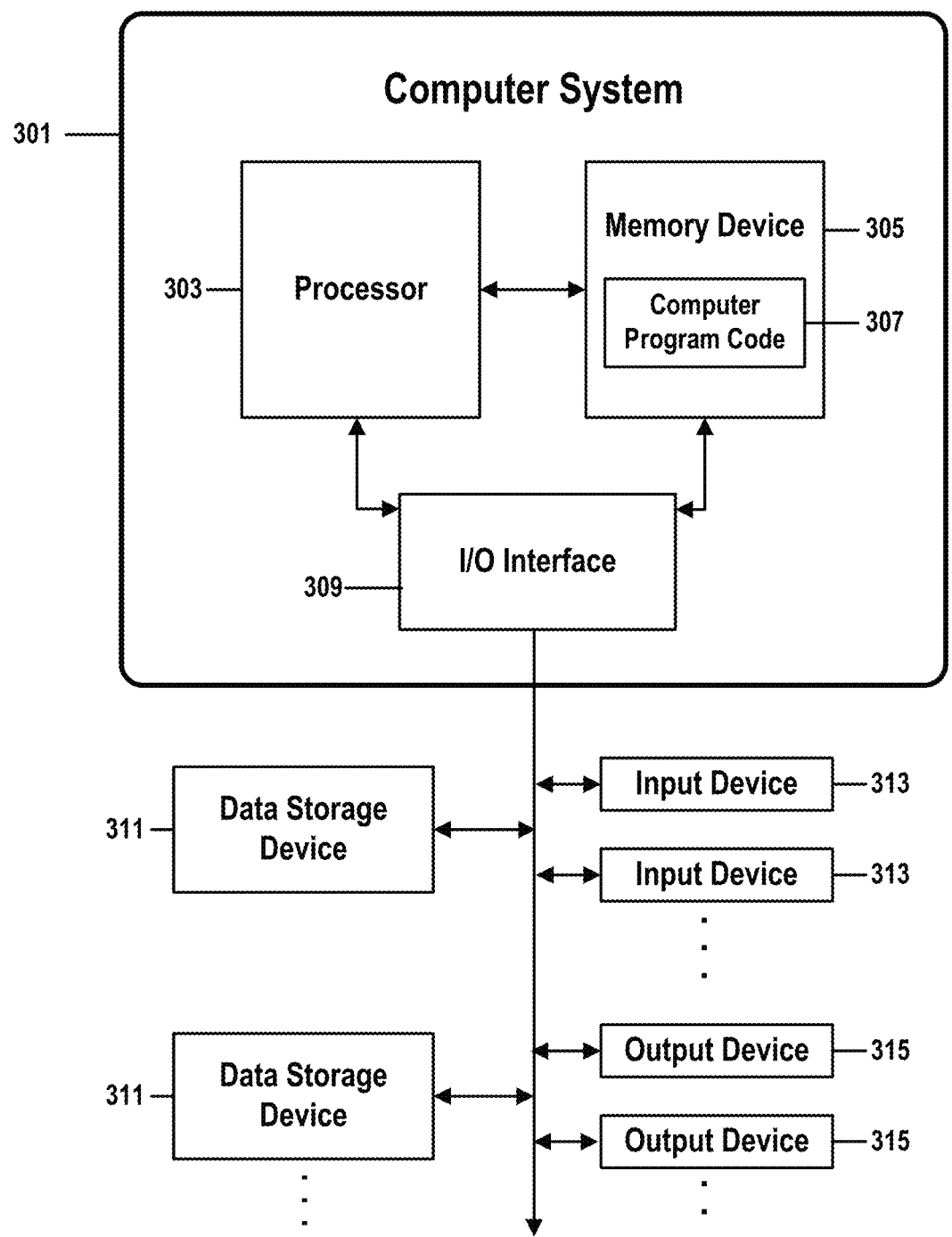
FIG. 3 shows the structure of a computer system and computer program code that may be used to implement a method for automated orchestration of complex server provisioning tasks in accordance with embodiments of the present invention.

FIG. 3 shows a structure of a computer system and computer program code that may be used to implement a method for automated orchestration of complex server provisioning tasks in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for automated orchestration of complex server provisioning tasks in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, where the code in combination with the computer system 301 is capable of performing a method for automated orchestration of complex server provisioning tasks.

Any of the components of the present invention could be created, integrated, hosted, maintained, deployed, managed, serviced, supported, etc. by a service provider who offers to facilitate a method for automated orchestration of complex server provisioning tasks. Thus the present invention discloses a process for deploying or integrating computing infrastructure, comprising integrating computer-readable code into the computer system 301, where the code in combination with the computer system 301 is capable of performing a method for automated orchestration of complex server provisioning tasks.

One or more data storage units 311 (or one or more additional memory devices not shown in FIG. 3) may be used as a computer-readable hardware storage device having a computer-readable program embodied therein and/or having other data stored therein, where the computer-readable program comprises stored computer program code 307. Generally, a computer program product (or, alternatively, an article of manufacture) of computer system 301 may comprise the computer-readable hardware storage device.

While it is understood that program code 307 for a method for automated orchestration of complex server provisioning tasks may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for automated orchestration of complex server provisioning tasks is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
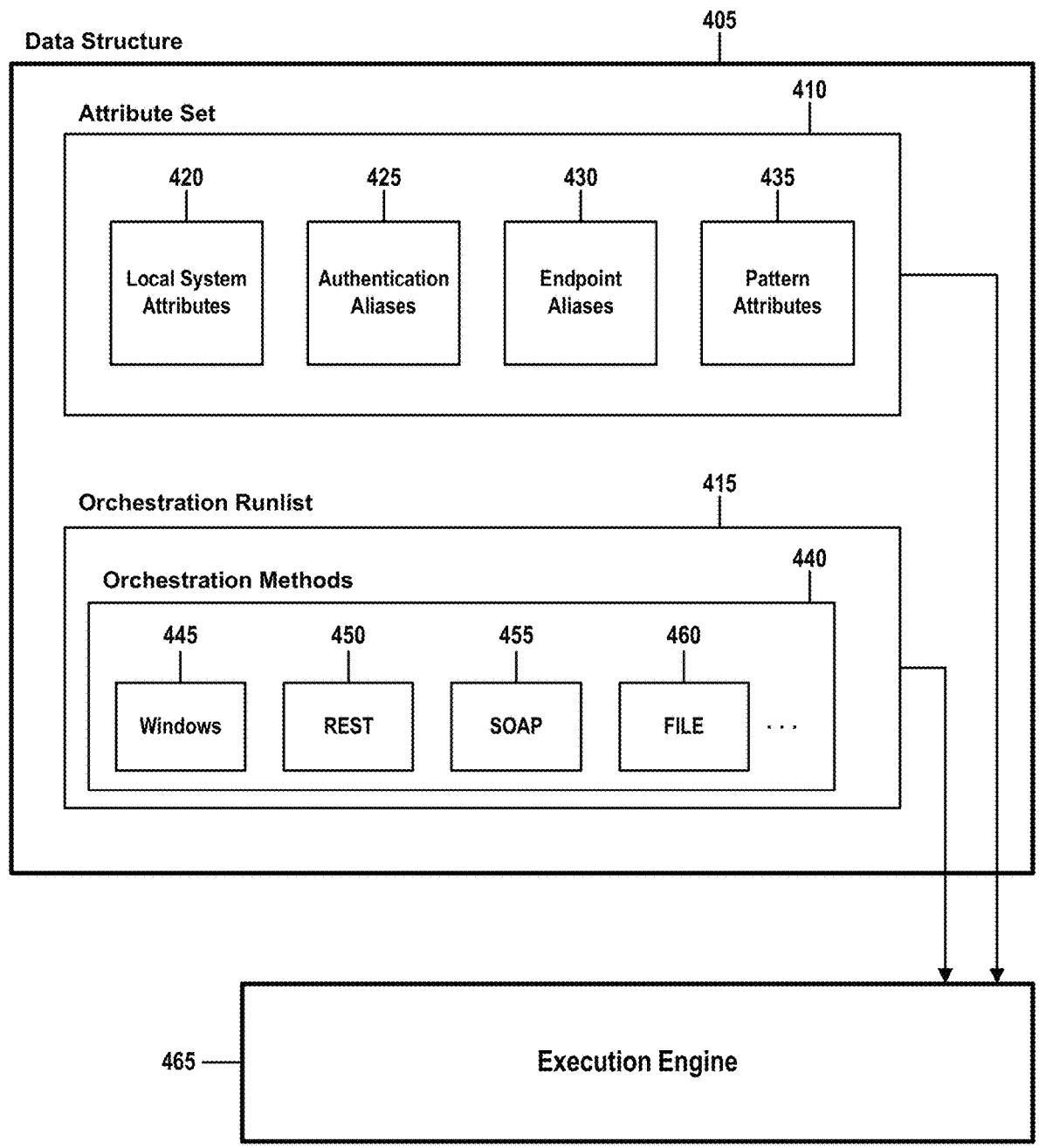
FIG. 4 illustrates a data structure and execution engine used by a method and systems for automated orchestration of complex server provisioning tasks in accordance with embodiments of the present invention.

FIG. 4 illustrates an "attribute-set/orchestration-runlist" 405 and an execution engine 465, both used by a method for automating the orchestration of complex server provisioning tasks in accordance with embodiments of the present invention. FIG. 4 shows elements identified by reference numbers 405-465.

The data structure 405 comprises an attribute set 410 and an orchestration runlist 415, both of hick pray be implemented by any means known in the art. The data structure 405 may, for example, be implemented as a DB2 relational database, as a collection of business objects, or via a combination of databases, scripting languages, computer-programming languages like XML (Extensible Markup Language) or JSON (JavaScript Object Notation) or any other software tools known in the art.

Embodiments use the data structure 405 and execution engine 465 to provide a data-driven approach to orchestrating the process of building a virtualized computing environment. The runlist 415 comprises low-level orchestration methods 445-460, packaged as reusable modules, each of which describes how to perform a generic task comprised by an orchestration procedure. At runtime, execution engine 465 dynamically selects contextual information from the attribute set 410 and adds it to the generic orchestration methods 440 in order to instantiate the orchestration methods 440 as a set of runlist tasks capable of building a specific virtualized computing environment. The execution engine 465 then compiles these runlist tasks into a "runlist" 415 that may be further tailored by the addition of contextual information that becomes known only when the virtualized environment is about to be built. The task of building the virtualized environment can then be automatically orchestrated by simply performing each contextualized runlist task of the compiled runlist 415.

Attribute set 410 contains contextual information that may, for example, identify data needed to provision or configure a component of a particular virtualized environment. Each attribute of attribute set 410 may be selected as a function of a characteristic of the virtualized environment to be built, such as a location or site at which to provision a virtual resource, an operating environment of platform of the system to be built, or a pattern that identifies characteristics of components that may be comprised by a virtualized environment.

In some embodiments, a distinct attribute set data structure 410 may store contextual information for each combination of a pattern, a destination location, a platform, or other characteristics of a virtualized environment expected to be built. This data-driven approach allows embodiments to automatically orchestrate a specific build procedure by simply editing information stored in a small data structure, rather than by manually selecting and customizing a distinct set of orchestration methods or other business processes for each possible build.

Attribute set 410 may comprise any data deemed necessary to generate a custom runlist tailored to a specific build project, where components of that specific project are each described generically by a corresponding pattern. An attribute set 410 may, for example, comprise pattern-specific values or pointers to endpoint aliases and authentication aliases necessary to generate a runlist 415 that is contextualized to a particular virtualized system. Once data comprised by the attribute set 410 is combined with a orchestration methods 445-460 to generate tasks of a runlist 415, that runlist 415 will contain all information necessary to automatically orchestrate the build. Embodiments and examples discussed in this document describe the particular set of attribute classes 420-435, but these descriptions should not be construed to limit other embodiments to only this particular set of attributes.

The attributes shown in FIG. 4 comprise:

Local system attributes 420 identify information about specific, known, nodes of the virtualized system to be provisioned and built, such as a hostname or an IP address. When provisioning a virtualized system, values of these attributes may become known only at runtime, when hostnames, IP addresses, and other dynamically allocated resources are provisioned. Values of local system attributes 420 thus cannot be statically defined prior to runtime. Embodiments of the present invention solve this problem by generating standardized placeholder attribute data objects that can be embedded into orchestration methods 445-460 in order to instantiate those methods 445-460 into runlist tasks. These objects may then be populated by execution engine 465 at runtime, when actual values of the local system attributes become known.

Authentication aliases 425 are software objects that store system credentials that may be presented by the execution engine 465 at runtime in order to request authorization to perform a secured or privileged task. These authorizations may be specific to a particular orchestrated build, such as an authorization necessary to access a certain resource at a particular computing site or business unit. In one example, a higher authorization level might be required to install an application on a secured mission-critical server dedicated to secured applications, but a lower level may be needed to install the same application on a publicly accessible Web server.

These credentials may comprise keys, passcodes, or other data items that can be used at runtime to authenticate an identity, authorization, security level, or other credentials of execution engine 465. Because authentication credentials must generally be retrieved and used by means of a secure method, embodiments may store authentication aliases 425 as encrypted, password-protected software objects or in other forms that may be accessed only by means of a key or other security mechanism. In this way, embodiments of the present invention may allow the execution engine 465 at runtime to securely retrieve encrypted credentials stored as authentication aliases 425, decrypt them into valid usernames, passwords, or other types of credentials, and then present the decrypted credentials as necessary to authorize runlist tasks required by the provisioning orchestration process. This procedure provides an advantage of ensuring that secured credentials need never be exposed as plain-text computer source code or script instructions.

Endpoint aliases 430 store information that identifies infrastructure components comprised by a client's environment. These components might, for example, comprise a static IP address, hostname, or other identifier of a specific backup storage unit, application server, network-attached storage device, or port. If this information becomes known only at runtime, embodiments may prior to runtime embed placeholder descriptors into runlist tasks generated from orchestration methods 445-460, allowing execution engine 465 to load the true endpoint values into those descriptors when the actual, build-specific, values become known. This approach obviates the need to store static identifiers of every possible infrastructure component within orchestration methods, thus reducing the total number of orchestration methods that must be stored and maintained.

Pattern Attributes 435 comprise pattern-specific values. If known prior to runtime, execution engine 465 may embed these values directly into runlist tasks as those tasks are generated from orchestration methods 445-460. If the values are not known until runtime, execution engine 465 may instead embed placeholder variables into the runlist tasks, and then populate those placeholders with pattern-specific values as they become known.

These pattern-specific values may, for example, identify a particular client, operating environment, or software application, and may be protected by an encryption method. Pattern attributes 435 are may comprise, among other things, a combination of static values, values input by a user, values that identify global parameters, or values of parameters that are related to a specific client. Information stored as pattern attributes 435 may thus be used by execution engine 465 to provide a significant portion of the context required to transform a generic, predefined, orchestration method 445-460 into a set of build instructions contextualized for a particular build effort.

As described above, orchestration runlist 415 comprises an ordered sequence of runlist tasks, each of which is generated by adding contextual values or placeholder variables to generic, template-like, orchestration methods 445-460. If, for example, an orchestration method identifies a procedure required to provision a virtual machine, to respond to a provisioning error, or to configure an application, augmenting information might identify an "endpoint" location, site, or platform at which a method is to be performed; an "authentication alias" security credentials that must be presented in order to be allowed to perform the method; or network identifiers of infrastructure components. The resulting runlist may then be further contextualized at runtime by populating these placeholders with build-specific values that become known only at or immediately before the build process occurs. Such build-specific values might comprise items such as an IP address of a port or a server's hostname.

This multi-level, dynamically self-configuring approach enables a relatively small set of generic orchestration methods and a single runlist to be tailored to build a large number of virtualized systems at different sites and under different operating environments, where contextual information needed to customize each runlist may be retrieved from an attribute set of an instance of data structure 405. In this way, embodiments may generate customized runlists that each implement specific pattern definition by means of tailored runlist tasks, where those tasks are created by augmenting generic or template orchestration methods that may be shared by many patterns, environments and locations.

Orchestration methods 445-460 (and other possible methods not shown in FIG. 4) are reusable modules that each comprise instructions for performing a task using a known API, framework, or service like Windows REXEC (Remote Exec), SSH (Secure Shell), REST services, or SOAP, or that that each identify a file 460 of instructions for performing a provisioning task.

Embodiments of the present invention may store orchestration methods 445-460 as elements of data structure 405 in a form in which key parameters are represented as variables that may be assigned values specific to a particular build. These values add build-specific context to an orchestration method, in effecting creating a runlist task that is a contextualized instance of the method, and that may be incorporated into a runlist 415 that is specific to the particular build.

In one example, an orchestration method designed to perform a specific provisioning task may be implemented as a standard SOAP XML envelope. If a certain piece of information (such as a specific server's hostname) required to perform that task cannot be known until the build process begins, that piece of information can be represented by a placeholder variable stored within the envelope. At runtime, when the required piece of information becomes known, the execution engine 465 (or a similar component of the embodiment) use that information to assign a value to the variable. As will be explained in FIG. 5, this assignment provides build-specific context to the orchestration method, converting it into a runlist task.

In other examples, execution engine 465 might use a similar procedure to convert an orchestration method implemented as an SSH or Windows command into a build-specific runlist task by assigning build-specific values to abstracted placeholders or variables embedded into the command.

Execution engine 465 embodies or performs the actual orchestration process: receiving or retrieving input that identities a pattern, a build location, a build platform, and other build-specific characteristics; embedding this input into an instance of the attribute set 410 data structure; selecting orchestration methods 445-460 from the orchestration methods data structure 440 as a function of the build-specific pattern or other input; instantiating each selected orchestration method as a runlist task by adding to the selected method contextual information (or placeholders that will store build-specific values of the contextual information) culled from attribute set 410; compiling an orchestration runlist 415 as a sequence of the runlist tasks, where the sequence is identified by the pattern or other input; further contextualizing certain of the runlist tasks of runlist 415 by assigning to each placeholder a value that becomes known at runtime; and then building the virtualized system by performing each runlist task of runlist 415.

The execution engine 465 thus dynamically creates a build-specific runlist by selecting, contextualizing, and instantiating a set of generic orchestration methods as a set of build-specific runlist tasks. In this way, a complex orchestration procedure may be generated on-the-fly at runtime from a generic pattern and a relatively small number of generic template orchestration methods, a small attribute set data structure 410, a small number of user inputs, and sets of data items that become known at runtime. This approach provides the advantage of eliminating the need to manually create, store, and maintain a unique combination of runlist tasks for every possible type of system build.

Figure 5:
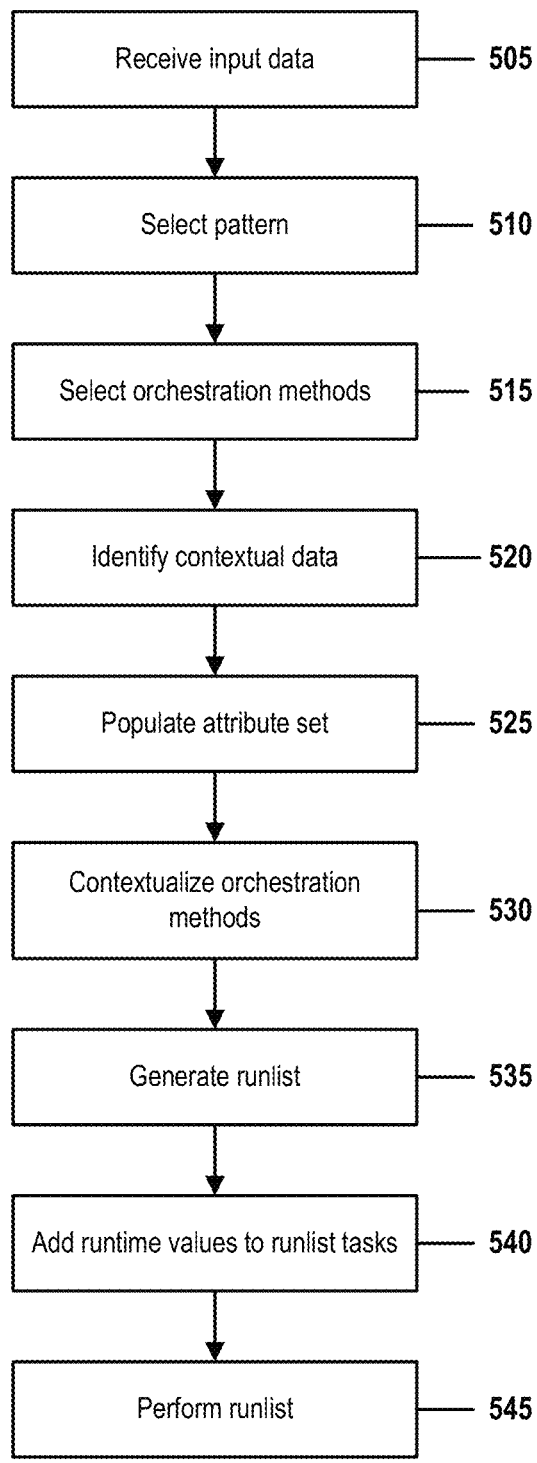
FIG. 5 is a flow chart that illustrates the steps of a method and systems for automated orchestration of complex server provisioning tasks in accordance with embodiments of the present invention.

FIG. 5 is a flow chart that illustrates steps of a method and systems for automated orchestration of complex server provisioning tasks in accordance with embodiments of the present invention. FIG. 5 contains steps 505-545.

In step 505, a cloud-orchestration optimization system receives input data from which the system is able to characterize a virtualized computing environment or virtualized system that is to be built. The task of building this virtualized environment may comprise any provisioning, deployment, configuration, or other tasks known to be steps of such a build effort. This document refers to the selecting, configuring, management, and performance of these tasks as "orchestrating" the build effort.

This input data may comprise, among other things:
  a description of a destination to which the virtualized system must be deployed. This description may, for example, specify a data center within which the virtualized system will be deployed; a server cluster upon which the virtualized system will be deployed; a business function that components of the virtualized system will serve or perform, such as engineering, accounting, test, maintenance, or development; a class of management services that will manage the virtualized environment; or any other information that may identify a physical, logical, or functional destination where the system will be built;
  information that identifies a platform upon which to the virtualized environment will be built, such as a VMWare VSphere platform or a Microsoft Windows-based platform; and
  information that may be used to select one or more patterns. As described above, a pattern is a set of generalized tasks and components required to build a particular type or class of virtualized system. A pattern may, for example, comprise high-level identifications of a host operating system, middleware components, backup policies, security policies, server security settings, server configurations, and software applications required to build a virtualized multi-user Oracle-based database-development environment.

The input data may be received by any means known in the art. In some embodiments, for example, an interactive user interface may allow an operator or other user to select a destination, platform, and class of pattern, or it may allow the system to determine this information in response to other types of user input that identify a user's requirements. In other cases, this information may all or in part be retrieved from a stored configuration file, inferred from historical records, or determined by other means known in the art.

In step 510, the system selects a specific pattern as a function of the data received in step 505. The input data may have specified a particular pattern to be selected or a set of patterns from which a single pattern may be selected, but in other cases, certain elements of the input data will allow the system to directly or indirectly infer an identification of a single pattern.

In step 515, the system selects a set of orchestration methods 445-460 and stores the orchestration methods 445-460 (or pointers to those methods) in data structure 405. As shown in FIG. 4, these methods each comprise a generalized, or template, version of a task required to build a system associated with the pattern selected in step 510.

If, for example, the selected pattern requires a task of provisioning a particular type of application subset of orchestration methods 445-460 might each generically identify one step of that provisioning task.

Because orchestration methods 445-460 are at this point mere templates, they do not yet identify build-specific information that will be required to build the virtualized system or environment. In one example, an orchestration method that identifies a step of provisioning a network connection of an application server would not identify an IP address or network segment associated with that server.

As shown in FIG. 4, each orchestration method 445-460 may comprise instructions that conform to any language convention, framework, API, or service known in the art. One orchestration method, may, for example, comprise a SOAP XML envelope, while a second method might define a task to be performed by means of Windows REXEC instructions, and a third method may merely identify a distinct, external file that contains computer instructions for implementing the third method.

In step 520, the system identifies contextual data that may be used to add context to orchestration methods 445-460 such that the contextualized instances of methods 445-460 perform specific build tasks for the particular virtualization environment to be built. This identification may be performed as a function of input data received in step 505 or of information comprised by the pattern selected in step 510.

If, for example, the pattern specifies that a virtual LAN must be provisioned in order to build a class of virtualized environments associated with the pattern, the resulting orchestration methods necessary to provision virtual LAN components identified by the pattern would need to be supplied with network identifiers for the LAN's virtual components.

In some cases, this required information may be determined as a function of input received in step 505. In one example, a destination and platform identified by the input may comprise static IP addresses required by a corresponding orchestration method selected in step 515. In such a case, the required addresses may be known at the time when the orchestration method is selected.

But in other cases, required information may not be known until, or shortly before, execution engine 465 is ready to begin the actual build process. In those cases, a placeholder variable may be created for each unknown required element of information, where that placeholder may be assigned a value once the unknown information becomes known.

In step 525, the system populates attribute set 410 of data structure 505 with contextual data elements (referred to here as "attributes") identified in step 520. In examples and embodiments discussed here, and as described in detail in FIG. 4, these attributes 510 may comprise local system attributes 420, authentication aliases 425, endpoint aliases 430, and pattern attributes 435. In other embodiments, additional or different attributes may be collected and stored, as necessary to perform required build functions.

If an actual value of a required contextual data element is not yet known, a placeholder may be stored in a corresponding location of attribute set 410. The existence of such a placeholder tells the system that a value of the corresponding data element will need to be identified prior to beginning the build process.

In step 530, the system instantiates each selected orchestration method 445-460 by inserting or embedding into each orchestration method 445-460 one or more of the contextual data elements stored in attribute set 410.

In a case where a build-specific value of an attribute is not yet known, a placeholder variable will instead be embedded into each orchestration method 445-460 that requires that as-yet-unknown value.

This document refers to each instantiated orchestration method as a runlist task or as a contextualized instance of a corresponding orchestration method. Where an orchestration method identifies a specific procedure for performing a generic build task that may be required to build any of an entire class of virtualized environments, a contextualized runlist-task instance of that orchestration method is instead specific to the particular virtualized environment to be built.

In step 535, the runlist tasks generated in step 530 are arranged in a sequential order that may be inferred from, or directly or indirectly identified by, the pattern. This document refers to this sequential list of runlist tasks as an orchestration runlist 415. In certain embodiments, execution engine 465, or other components of the system, will completely build the virtualized system in step 545 by performing the sequence of runlist tasks comprised by the runlist 415.

In step 540, execution engine 465 or other components of the system prepare to build the virtualized system by adding remaining contextual information to the runlist 415. In this step, placeholders that in step 530 had been embedded into the runlist tasks are assigned the build-specific values as those values become known.

For example, a placeholder may have been created to identify a hostname or network identifier of a virtual-server resource to be provisioned, but because that hostname or identifier is dynamically allocated at the time the resource is provisioned, the hostname or identifier was unknown at the time that runlist tasks were created in step 525. But at build time, when execution engine 465 becomes ready to provision the resource, that hostname or identifier becomes known, allowing the hostname or identifier to be inserted into any runlist-task placeholders intended to store that information.

At the completion of step 540, the system will have generated a completely contextualized runlist of tasks that must be performed in order to build the desired virtualized environment. This sequence of runlist tasks identifies tasks analogous to an ordered set of procedures identified by the pattern, but will have been contextualized to apply to the specific virtualized environment, the build platform, the build destination, and other characteristics of the environment to be built.

In step 545, execution engine 465 or other components of the system perform each step of the runlist in sequential order. At the completion of this step, the virtualized environment or virtualized system will have been automatically built in satisfaction of requirements identified by input data received in step 505.

What is claimed is:

1. A virtualized-environment orchestration system comprising a processor, a memory coupled to the processor, and a computer-readable hardware storage device coupled to the processor, the computer-readable hardware storage device containing program code that, when run by the processor via the memory, implements a method for automated orchestration of complex server provisioning tasks, the method comprising:

the virtualized-environment orchestration system identifying a set of orchestration methods, where each orchestration method of the set of orchestration methods specifies a generic task of a set of generic tasks that must be performed in order to build a requested virtualized environment;

the virtualized-environment orchestration system instantiating each orchestration method of the set of orchestration methods as a distinct runlist task, where a first orchestration method of the set of orchestration methods is instantiated as a distinct runlist task by embedding at least one placeholder variable into the first orchestration method, where each placeholder variable identifies a storage location of a corresponding data element required by the first orchestration method, and where values cannot be assigned to the embedded placeholder variables until the time when the virtualized environment is being built;

the virtualized-environment orchestration system compiling the distinct runlist tasks into an orchestration runlist, where the orchestration runlist comprises instructions for building the entire virtualized environment, and where the runlist sequences the runlist tasks in an order determined by the set of generic tasks; and the virtualized-environment orchestration system assigning a value to each placeholder variable at the time when the virtualized environment is being built.

2. The virtualized-environment orchestration system of claim 1, further comprising:

the virtualized-environment orchestration system receiving input data that identifies characteristics of the requested virtualized environment, where the characteristics are required by the virtualized-environment orchestration system in order to select the set of orchestration methods.

3. The virtualized-environment orchestration system of claim 2, where the received input data comprises information that directly or indirectly identifies a platform upon which to build the virtualized environment and a destination at which to build the virtualized environment.

4. The virtualized-environment orchestration system of claim 3, where the destination identifies information selected from the group consisting of:

a data center within which the virtualized environment will be deployed, a server cluster upon which the virtualized environment will be deployed, a type of business function that the virtualized environment will serve, and a class of management services that will manage the virtualized environment.

5. The virtualized-environment orchestration system of claim 1, where an orchestration method of the set of orchestration methods is stored in a format compliant with an implementation-framework convention selected from the group consisting of: REXEC (Remote Exec), Windows SSH (Secure Shell), REST (Representational State Transfer), SOAP (Simple Object Access Protocol), a Windows API (Application Programming Interface), and NIX package manager.

6. The virtualized-environment orchestration system of claim 1, where each placeholder variable identifies a method attribute, a local system attribute, an authentication alias, or an endpoint alias, where the method attribute represents a characteristic of an orchestration method of the set of orchestration methods, where the local system attribute represents a characteristic of an infrastructure component of the virtualized environment, where the authentication alias represents security credentials that must be possessed by the virtualized-environment orchestration system in order to perform a runlist task, and where the endpoint alias represents a characteristic of an infrastructure component of a computing platform upon which the virtualized environment will be deployed.

7. The virtualized-environment orchestration system of claim 1, where the first orchestration method of the set of orchestration methods uniquely identifies a computer file that stores instructions for performing steps of the first orchestration method of the set of orchestration methods.

8. A method for automated orchestration of complex server provisioning tasks, the method comprising:

a virtualized-environment orchestration system identifying a set of orchestration methods, where each orchestration method of the set of orchestration methods specifies a generic task of a set of generic tasks that must be performed in order to build a requested virtualized environment;

the virtualized-environment orchestration system instantiating each orchestration method of the set of orchestration methods as a distinct runlist task, where a first orchestration method of the set of orchestration methods is instantiated as a distinct runlist task by embedding at least one placeholder variable into the first orchestration method, where each placeholder variable identifies a storage location of a corresponding data element required by the first orchestration method, and where values cannot be assigned to the embedded placeholder variables until the time when the virtualized environment is being built;

the virtualized-environment orchestration system compiling the distinct runlist tasks into an orchestration runlist, where the orchestration runlist comprises instructions for building the entire virtualized environment, and where the runlist sequences the runlist tasks in an order determined by the set of generic tasks; and the virtualized-environment orchestration system assigning a value to each placeholder variable at the time when the virtualized environment is being built.

9. The method of claim 8, further comprising:

the virtualized-environment orchestration system receiving input data that identifies characteristics of the requested virtualized environment, where the characteristics are required by the virtualized-environment orchestration system in order to select the set of orchestration methods.

10. The method of claim 9, where the received input data comprises information that directly or indirectly identifies a platform upon which to build the virtualized environment and a destination at which to build the virtualized environment, and where the destination identifies information selected from the group consisting of:

a data center within which the virtualized environment will be deployed, a server cluster upon which the virtualized environment will be deployed, a type of business function that the virtualized environment will serve, and a class of management services that will manage the virtualized environment.

11. The method of claim 8, where an orchestration method of the set of orchestration methods is stored in a format compliant with an implementation-framework convention selected from the group consisting of: REXEC (Remote Exec), Windows SSH (Secure Shell), REST (Representational State Transfer), SOAP (Simple Object Access Protocol), a Windows API (Application Programming Interface), and NIX package manager.

12. The method of claim 8, where each placeholder variable identifies a method attribute, a local system attribute, an authentication alias, or an endpoint alias,
   where the method attribute represents a characteristic of an orchestration method of the set of orchestration methods,
   where the local system attribute represents a characteristic of an infrastructure component of the virtualized environment,
   where the authentication alias represents security credentials that must be possessed by the virtualized-environment orchestration system in order to perform a runlist task, and
   where the endpoint alias represents a characteristic of an infrastructure component of a computing platform upon which the virtualized environment will be deployed.

13. The method of claim 8, where the first orchestration method of the set of orchestration methods uniquely identifies a computer file that stores instructions for performing steps of the first orchestration method of the set of orchestration methods.

14. The method of claim 8, further comprising providing at least one support service for at least one of creating, integrating, hosting, maintaining, and deploying computer-readable program code in the virtualized-environment orchestration system, where the computer-readable program code in combination with the virtualized-environment orchestration system is configured to implement the identifying, the instantiating, the compiling and the assigning.

15. A computer program product, comprising a computer-readable hardware storage device having a computer-readable program code stored therein, the program code configured to be executed by a virtualized-environment orchestration system comprising a processor, a memory coupled to the processor, and a computer-readable hardware storage device coupled to the processor, the computer-readable hardware storage device containing program code that, when run by the processor via the memory, implements a method for automated orchestration of complex server provisioning tasks, the method comprising:
   the virtualized-environment orchestration system identifying a set of orchestration methods, where each orchestration method of the set of orchestration methods specifies a generic task of a set of generic tasks that must be performed in order to build a requested virtualized environment;
   the virtualized-environment orchestration system instantiating each orchestration method of the set of orchestration methods as a distinct runlist task,
      where a first orchestration method of the set of orchestration methods is instantiated as a distinct runlist task by embedding at least one placeholder variable into the first orchestration method,
      where each placeholder variable identifies a storage location of a corresponding data element required by the first orchestration method, and
      where values cannot be assigned to the embedded placeholder variables until the time when the virtualized environment is being built;
   the virtualized-environment orchestration system compiling the distinct runlist tasks into an orchestration runlist, where the orchestration runlist comprises instructions for building the entire virtualized environment, and where the runlist sequences the runlist tasks in an order determined by the set of generic tasks; and
   the virtualized-environment orchestration system assigning a value to each placeholder variable at the time when the virtualized environment is being built.

16. The computer program product of claim 15, further comprising:
   the virtualized-environment orchestration system receiving input data that identifies characteristics of the requested virtualized environment, where the characteristics are required by the virtualized-environment orchestration system in order to select the set of orchestration methods.

17. The computer program product of claim 16,
   where the received input data comprises information that directly or indirectly identifies a platform upon which to build the virtualized environment and a destination at which to build the virtualized environment, and
   where the destination identifies information selected from the group consisting of:
      a data center within which the virtualized environment will be deployed,
      a server cluster upon which the virtualized environment will be deployed,
      a type of business function that the virtualized environment will serve, and
      a class of management services that will manage the virtualized environment.

18. The computer program product of claim 15, where an orchestration method of the set of orchestration methods is stored in a format compliant with an implementation-framework convention selected from the group consisting of: REXEC (Remote Exec), Windows SSH (Secure Shell), REST (Representational State Transfer), SOAP (Simple Object Access Protocol), a Windows API (Application Programming Interface), and NIX package manager.

19. The computer program product of claim 15, where each placeholder variable identifies a method attribute, a local system attribute, an authentication alias, or an endpoint alias,
   where the method attribute represents a characteristic of an orchestration method of the set of orchestration methods,
   where the local system attribute represents a characteristic of an infrastructure component of the virtualized environment,
   where the authentication alias represents security credentials that must be possessed by the virtualized-environment orchestration system in order to perform a runlist task, and
   where the endpoint alias represents a characteristic of an infrastructure component of a computing platform upon which the virtualized environment will be deployed.

20. The computer program product of claim 15, where the first orchestration method of the set of orchestration methods uniquely identifies a computer file that stores instructions for performing steps of the first orchestration method of the set of orchestration methods.

* * * * *